Patented Nov. 3, 1925.

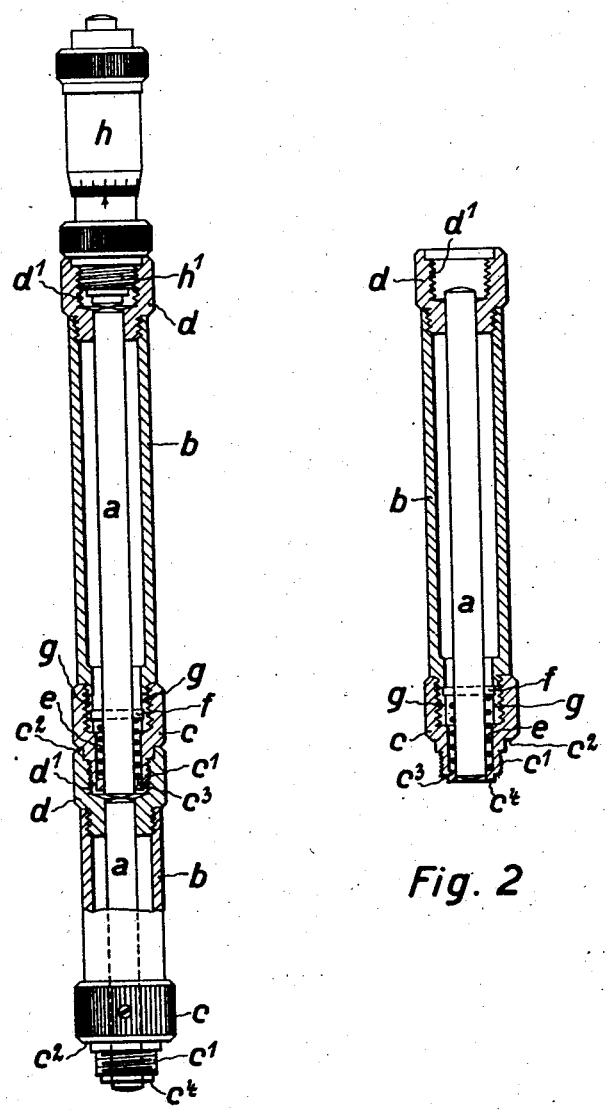

1,559,801

UNITED STATES PATENT OFFICE.

ADOLF STEINLE, OF JENA, GERMANY, ASSIGNOR TO THE FIRM OF CARL ZEISS, OF JENA, GERMANY.

CYLINDRICAL END GAUGE.

Application filed August 13, 1921. Serial No. 492,126.

(GRANTED UNDER THE PROVISIONS OF THE ACT OF MARCH 3, 1921, 41 STAT. L., 1313.)

*To all whom it may concern:*

Be it known that I, ADOLF STEINLE, a citizen of the German Empire, residing at Jena, Germany, have invented a new and useful Cylindrical End Gauge (for which I have filed an application in Germany, March 4, 1920, Patent No. 349,043; Switzerland, March 1, 1921, Patent No. 94,705; England, March 2, 1921, and Sweden, March 3, 1921), of which the following is a specification.

For gauging measuring tools, gauges and the like as well as for minute comparative measurements so-called standard end gauges are used, that is prismatic bodies, the terminal faces of which are ground exactly parallel and to a certain length measure. As a rule, several of the said end gauges of different lengths constitute a set and permit the making of any desired measure within a certain range of measurement by joining the suitable separate gauges. In the ordinary construction of the said end gauges having a comparatively large rectangular cross section, the same may simply be joined by adhesion so that connecting means are unnecessary. However, for a number of purposes, e. g., with comparatively long measures or when using end gauges in the way of templates for gauging hollow cylinders and the like, the aforesaid rectangular cross section is unhandy and unsuitable; hence in such cases cylindrical end gauges are used, the terminal faces of which are, as a rule, ground according to spherical surfaces. Such end gauges cannot be united any more to form composite gauges by being simply joined together, so that with them it has hitherto been impossible to join single end gauges to form one end gauge or template of a certain length. It is well known to unite cylindrical end gauges by the use of tubes, the inside diameter of which is equal to the outer diameter of the end gauges so as to be able to introduce two end gauges from both sides into the tube until they touch each other. An end gauge composed in such a way is, however, inconvenient for practical use and does not make sure that the single end gauges properly touch each other.

The object of the invention is to create a set of cylindrical end gauges, the single gauges of which can be joined in a reliable and simple way so that handy templates of different length can be composed of the same. This is achieved by uniting each end gauge with a holder of approximately the same length as itself and by uniformly devising the ends of the said holders in such a way as to permit of an optional joining of the end gauges. With the complete set the two ends of the holder are therefore so constructed as to correspond to the two members of one and the same separable combination, so that the one end of a holder can be connected to the other end of any other holder. This purpose is satisfied, e. g., by a screw-joint in such a way that all holders of one set possess at one end one and the same male screw and at the other end the corresponding female thread. However, any other suitable joint, e. g., a bayonet joint or the like may be used as well.

Considering the high degree of accuracy desired, the joining of the single end gauges must take place in such a manner that the force, with which two end gauge-holders are joined, e. g., screwed together, is not transmitted to the end gauges themselves. On the other hand, it must be seen to that the end gauges themselves are pressed against each other with a pressure that is independent of this force and invariable as far as possible. This is achieved by elastically connecting each end gauge to its holder in such a way that when joining its holder to that of a second end gauge it is only pressed against the latter by elastic means. In that way the force used in joining two holders can only become effective between the holders and thus be unable to effect the accuracy of the length of the template.

A particularly suitable and handy constructional form of the invention is attained by forming the end gauge-holders as sleeves, which enclose the end gauges for their whole length, thereby protecting them against damage and simultaneously affording an insulation against their being warmed by the heat from the hand of the user. The connecting pieces which permit of joining the single end gauge-holders can then be directly fitted to the sleeves so that each end gauge is enclosed by a casing from which only the two measuring surfaces project.

In order to be able to manufacture exactly to fractions of millimeters in a set of end gauges, corresponding to the invention, within the given range of measurement any measure whatever, it is advisable to use instead of one of the single end gauges a micrometer, representing an end gauge of variable length. The said micrometer is fitted at least at its one end with the same connecting piece as the end gauge-holders so that it can be connected with each of the end gauges.

In addition, it may be mentioned that with micrometer templates it is well known to enlarge the range of measuring of the template by screwing elongation pieces to the same. Such an adaptation of elongation pieces does not, however, admit by far of such high degree of accuracy as the use of end gauges exactly ground to length and hence it is useless for minute measurements.

In the annexed drawing the invention is illustrated by a constructional example in which it is assumed that the end gauges are always used as templates in conjunction with a micrometer. Fig. 1 shows, partly in section, a template composed of two end gauges and a micrometer, ready for use, while Fig. 2 represents a section through the larger end gauge of Fig. 1, viz. in that position which arises after the screwing off from the micrometer. The parts, recurring in the same way in the two end gauges, are denoted alike.

The end gauges proper are formed by cylindrical steel rods $a$, the ends of which are tempered and exactly ground to length according to spherical surfaces. Each of the said end gauges $a$ is enclosed by a sleeve $b$, provided at both ends with extension pieces $c$ and $d$ respectively bored for the central support of the appertaining rod. The aforesaid extension pieces form simultaneously the parts corresponding to each other of a screw-joint and with respect to the latter they have the same dimensions with all end gauges of the set. The one extension piece $c$ carries a male screw $c^1$, whilst the other one $d$ is provided with the corresponding female thread $d^1$. A stop surface $c^2$ disposed on the part $c$ necessitates that both parts are always screwed together to the same extent. In addition, there is disposed within each extension piece $c$ a spring $e$, enclosing the cylindrical end gauge $a$, which spring presses on the one hand against a stop surface $c^3$ of the part $c$ and on the other hand against a pin $f$, inserted through a transverse bore in the end gauge $a$. The pin $f$ engages on both sides in longitudinal slits $g$ of the sleeve $b$, so that the end gauge $a$, in opposition to the action of the spring $e$, can be a little displaced in the longitudinal direction relative to its sleeve. Besides, the slits $g$ are so designed, that in the unscrewed state as shown in Fig. 2, each end gauge is somewhat displaced to the top owing to the action of the spring $e$ as compared to the position for use relative to its sleeve, so that the measuring surface of the end gauge, previously projecting over the front $c^4$ of the extension piece $c$, somewhat recedes behind the said front and is thus protected against exterior damage.

When using the end gauges represented, it is necessary to always join to the side of the extension piece $d$—as shown in Fig. 1—a micrometer $h$, which can be screwed by means of its thread $h^1$ into any extension piece $d$. Owing to the screwing on of the micrometer $h$ the end gauges proper $a$ are a little pressed down within their sleeves, so that the pins $f$ are lifted off their contact surfaces, whereby the end gauges $a$ are pressed together by the force of the springs $e$ and pressed on the micrometer.

I claim:

1. In combination a plurality of rod-shaped end gauges, a holder for each gauge respectively, each holder slidably enclosing and being of substantially the same length as its gauge, and means carried by each end of each holder whereby two or more holders may be secured together with their gauges in axial alignment and with their adjacent ends in contact.

2. In combination a plurality of rod-shaped end gauges, a holder for each gauge respectively, each holder slidably enclosing and being of substantially the same length as its gauge, each holder having on one of its ends a male screw and on its other end a female screw for engagement with co-operating ends of adjacent holders respectively.

3. In combination a plurality of rod-shaped end gauges, a holder for each gauge respectively, each holder slidably enclosing and being of substantially the same length as its gauge, means carried by each end of each holder whereby two or more holders may be secured together with their gauges in axial alignment and with their adjacent ends in contact, and resilient means included between each gauge and its holder and adapted to urge the gauge in an axial direction.

4. In combination a plurality of rod-shaped end gauges, a holder for each gauge respectively, each holder slidably enclosing and being of substantially the same length as its gauge, means carried by each end of each holder whereby two or more holders may be secured together with their gauges in axial alignment and with their adjacent ends in contact, and a micrometer device, means whereby the micrometer device may be secured to an end of one of the gauges in axial alignment therewith and with its contact member in contact with said adjacent end.

ADOLF STEINLE.